United States Patent [19]

Fitzgerald

[11] Patent Number: 5,071,446

[45] Date of Patent: Dec. 10, 1991

[54] NUGGETS FOR HEATING AND A METHOD OF MAKING THE SAME

[75] Inventor: Jack D. Fitzgerald, Franklin, Va.

[73] Assignee: Union Camp Corporation, Wayne, N.J.

[21] Appl. No.: 493,187

[22] Filed: Mar. 14, 1990

[51] Int. Cl.$^5$ ................................................. C10L 5/14
[52] U.S. Cl. ......................................... 44/553; 44/590; 44/595; 44/598; 44/606; 264/15; 264/118
[58] Field of Search ................. 264/15, 109, 118, 112, 264/129, 140; 44/590, 595, 606, 500, 505, 550, 553, 598, 596, 530

[56] References Cited

U.S. PATENT DOCUMENTS

| | | | |
|---|---|---|---|
| 2,145,899 | 2/1939 | Simpson | 264/15 |
| 2,233,433 | 3/1941 | Smith | 264/118 |
| 3,836,354 | 9/1974 | Wienert | 264/15 |
| 3,843,336 | 10/1974 | Messman | 264/109 |
| 4,398,917 | 8/1983 | Reilly | 264/109 |
| 4,478,966 | 10/1984 | Helgesson et al. | 264/109 |
| 4,528,309 | 7/1985 | Gote | 524/13 |
| 4,620,892 | 11/1986 | Dodson et al. | 264/129 |

FOREIGN PATENT DOCUMENTS

| | | | |
|---|---|---|---|
| 1160416 | 1/1984 | Canada | 264/129 |
| 0307812 | 3/1989 | European Pat. Off. | 264/129 |
| 55-118851 | 9/1980 | Japan | 264/129 |

*Primary Examiner*—Mary Lynn Theisen
*Attorney, Agent, or Firm*—Edward J. Sites

[57] ABSTRACT

The invention discloses fuel nuggets with high heat value which is virtually dust-free, and a method of making the same. The nuggets are preferably made of scrap particleboard made of wood particles bonded together by a urea/formaldehyde adhesive. The scrap is hogged and shaped into roughly spherical nuggets of a preselected size suited for automated furnaces. The nuggets are then coated with an aqueous urea solution and then oven-dried to achieve a preselected moisture content.

21 Claims, No Drawings

NUGGETS FOR HEATING AND A METHOD OF MAKING THE SAME

BACKGROUND OF THE INVENTION

1. Field of the Invention

This invention pertains to nuggets made of wood particles and a resinous binder which are useful as fuel, for example in automated furnaces, and more particularly, to nuggets made from particleboard. The invention also pertains to a method of making the nuggets.

2. Description of the Prior Art

One of the commonly used materials in the building industry and related arts is particleboard. The term particleboard refers to a sheet of material having preselected dimensions and weight, and usually made from a blend of wood particles such as wood shavings, sawdust, plywood trim, etc., which are held together with a urea-formaldehyde binder. A description of how such particleboard is made can be found in U.S. Pat. Nos. 4,186,242 (Holmquist, Jan. 29, 1980) and No. 4,397,756 (Lehmann, Aug. 9, 1983). Because particleboard is frequently used in high visibility areas such as countertops, furniture, and the like, the industry has high quality control standards. Sheets of particleboard which deviate from the standards or exhibit surface irregularities are often scrapped. Particleboard also is relatively fragile, especially around the edges, and breaks easily. In addition, in the manufacture of particleboard there is inherently a certain amount of trim scrap from the molding process and other manufacturing processes. As a result, the manufacturers have quantities of particleboard which cannot be sold to the industry and cannot be recycled in that it is made with thermosetting resin. This material has either been shipped to land fills or incinerated.

One recognized problem with particleboard is that if the board is not sealed, the formaldehyde used in the binder is released to the ambient atmosphere. It has been found that exposure of people to large concentrations of formaldehyde in the atmosphere is undesirable because it can be the cause of health problems. Some of these problems are discussed in U.S. Pat. No. 4,443,354 (Eian, Apr. 17, 1984). Various solutions have been proposed in the past to deal with this problem, however, none of them were found to be acceptable in the industry. For example, the above-mentioned U.S. Pat. No. 4,443,354 proposed an absorbent material for use as a filtration media for absorbing formaldehyde. The above-mentioned U.S. Pat. No. 4,186,242 proposed treating lignocellulosic composites (i.e., the wood chips) with an ammonium-based lignosulfonate. The above-mentioned U.S. Pat. No. 4,397,756 proposed adding a carbohydrate-based material such as cooked or gelatinized starch. U.S. Pat. No. 4,410,685 (Williams, Oct. 18, 1983) proposed a urea-formaldehyde resin as an adhesive which is hydraulically stable whereby free formaldehyde is eliminated.

It is clear from the above that there is a need for a product which can be made of particleboard scrap. More particularly, there is a need for a product which can be made in a manner so as to limit the release of formaldehyde therefrom.

SUMMARY OF THE INVENTION

It has been found that, surprisingly, particleboard can be broken up or hogged into smaller nuggets suitable for use in automatic furnaces and other wood burning stoves adapted to burn pelletized fuels. The nuggets have a very high heating value, and may be packaged in plastic bags which are closed, for example, by heat sealing. The bags are transported to retailers for distribution to customers. It has further been found that formaldehyde release from the nuggets can be controlled if the nuggets, or the boards (prior to the hogging step), are sprayed with an aqueous solution of urea of 1–10% by weight of the nuggets and then subjected to heat to dry the coated nuggets to reduce their moisture content to about 5–7%. Surprisingly, nuggets treated this way emit much lower amounts of formaldehyde so that they can be used safely by customers. The treatment does not affect the heating value of the nuggets.

DETAILED DESCRIPTION OF THE INVENTION

Particleboard is made, for example, in sheets of $4' \times 8'$, $4' \times 10'$, etc., in thicknesses ranging from $\frac{1}{2}$ to $1\frac{1}{2}$, and consists of a furnish of wood particles bonded by a urea-formaldehyde resin. After the sheets are made by methods well known in the art, they undergo quality control. Sheets rejected for failure to meet the standards of the industry, hereinafter referred to as scraps, are separated for further processing as described below. Although in the following, relatively large size scraps are contemplated, i.e., scraps having dimensions close to the dimensions of the original sheets, it should be noted the following process and the nuggets produced therefrom may also be used from other pieces of particleboard left over from manufacturing processes.

The scrap is broken up or hogged into smaller pieces having an irregular shape. The irregular-shaped pieces are then hogged or shaped a second time using a swing-type hammer hog to obtain roughly circular nuggets of predetermined diameters. It was found that these nuggets must be of particular diameters in order to be useful as fuel in automated furnaces. If the nuggets are too large, they cannot be introduced into the furnace by automated feeders. Dust and minute nuggets are undesirable because they result in an explosive environment and furthermore have a low heat content. Therefore, after the second hogging operation, the nuggets are passed through several sieves. Nuggets exceeding $\frac{1}{2}$ inch in diameter are recycled. Nuggets having an approximate diameter of less than $\frac{1}{4}$ inch are discarded. Thus, the remaining nuggets have a nominal diameter of about $\frac{1}{2}$ inch, with no nugget having a diameter of less than $\frac{1}{4}$ inch.

As previously mentioned, one problem with particleboard of this type, and the nuggets made therefrom, is that over time it releases formaldehyde. In order to reduce formaldehyde emission, the nuggets resulting from hogging are treated as follows. First an aqueous urea solution is prepared consisting of dry or prilled urea and water. The urea solution is sprayed on the nuggets. Next, the sprayed nuggets are dried, for example, in an oven, preferably until the treated nuggets have the same moisture content as the untreated nuggets. The treated nuggets release only a minute amount of formaldehyde.

The solution for coating the nuggets may consist, for example, of about 30–60% dry or prilled urea by weight mixed with water at ambient temperature. Higher concentrations of urea may be obtained if the water is heated above ambient temperature. Preferably, the solution is coated at about 1-10% by weight of the nuggets. Higher coating levels would need too much heat to reduce the moisture level of the treated nuggets to acceptable levels. Preferably, the treated nuggets consist of about 1% coating solution prior to drying. Coating below this level is not significantly effective.

After the coating is applied, the treated nuggets are dried at a temperature in the range of 212°-350° F. Higher temperatures are not recommended because the nuggets may get scorched. The nuggets must be dried for a time sufficient to reduce the moisture content of the treated nuggets to the level of the untreated nuggets, i.e. to about 5-7%. For example, good results were obtained by treating nuggets with a solution of urea of 1% by weight of nugget, and heating the nuggets at 217° F. for about an hour.

In order to compare the formaldehyde released by the nuggets formed in accordance with this invention with other products, three samples were analyzed using standard desiccator tests for formaldehyde, as indicated below. Sample #1 consisted of nuggets with a 1% coating of powdered dry urea by weight. Sample #2 consisted of nuggets with a 1% aqueous urea solution by weight of the nuggets. Sample #3 consisted of nuggets coated with a 1% urea solution and then dried. In samples #2 and #3, the urea solution was prepared from 50% dry urea by weight.

| Sample | Formaldehyde Emission (microgram/ml) |
|--------|--------------------------------------|
| #1     | 0.81                                 |
| #2     | 0.67-0.73                            |
| #3     | 0.02-0.03                            |

The emission obtained for sample #3 corresponds to 0.05 ppm, while the emission for the first sample corresponds to about 0.19 ppm.

Testing was also done to determine the heat content and the composition of the byproducts produced by burning the nuggets produced in accordance with this invention. It was found that treated nuggets prepared in accordance with this invention had heat contents in the range of 8400-9000 BTU/lb.

Chemical analysis of the treated nuggets indicates that they have a bulk density of 20-25 lbs/cu. ft., so that they can be easily packaged in lots of 33-⅓ lbs. They have a moisture content of about 5-7%, an ash content of less than 1%, and contain less than 1% fines. An important advantage of the nuggets is that they are dust free.

Thus, the nuggets produced as described above are an ideal fuel for automated furnaces and wood stoves adapted for burning pelletized fuel because they are clean, dry, dust-free, have a high heat content, and do not produce noxious fumes such as formaldehyde.

In the above-described, formaldehyde emission is reduced to ambient levels by treating the nuggets with a solution of urea after hogging. Similar results can be obtained by treating the scraps with the urea and then heating the scraps before the hogging step. However, the resultant nuggets would remain untreated around the peripheral edges where separation occurred from the nuggets and formaldehyde may be emitted at the edges.

While the actual phenomenon which results in the reduced formaldehyde emission by the above-described technique is not presently known for certainty, it is suspected that when the nuggets (or particleboard or scraps) are heated, the urea in the aqueous solution is transformed into ammonia ($NH_3$) which acts as a formaldehyde scavenger.

Obviously, numerous modifications may be made to the invention without departing from its scope as defined in the appended claims.

I claim:

1. A method of making clean, dust free, dry, urea treated fuel nuggets for burning in automated furnaces and woodburning stoves adapted to burn pelletized fuels, which treated nuggets have a heat content of at least 8400 BTU/lb. and emit lower amounts of formaldehyde than untreated nuggets, and which nuggets are made from particleboard material which contains urea-formaldehyde resin, said method comprising the steps of:

breaking and shaping said particleboard into smaller, generally spherical pieces;

sorting said spherical pieces to choose nuggets having preselected diameters effective to be used in the automated furnaces and woodburning stoves;

treating said nuggets with urea to reduce formaldehyde emissions; and drying said urea treated nuggets for a time and at a temperature effective to reduce the moisture content of said treated nuggets to the moisture content of said nuggets.

2. The method of claim 1 wherein said treatment with urea comprises coating said nuggets with an aqueous urea solution.

3. The method of claim 2 wherein said solution contains 30-60% urea by weight.

4. The method of claim 2 wherein said treated nuggets comprise from about 1-10% by weight of said solution.

5. The method of claim 2 wherein said treated nuggets comprise about 1% by weight of said solution.

6. The method of claim 1 wherein said moisture content of said nuggets is between about 5-7%, based on the weight of the nuggets.

7. The method of claim 1 wherein said nuggets are dried at a temperature in the range of 212°-350° F.

8. The method of claim 7 wherein said nuggets are dried at about 217° F.

9. Clean, dust free, dry, urea treated fuel nuggets for use in automated furnaces and woodburning stoves adapted to burn pelletized fuels, which treated nuggets have a heat content of at least 8400 BTU/lb. and emit lower amounts of formaldehyde than untreated nuggets, comprising:

wood particles having a predetermined diameter effective to be used in the automated furnaces and woodburning stoves;

an adhesive for bonding the wood particles, said adhesive comprising urea and formaldehyde; and an amount of urea effective to reduce the emission of formaldehyde.

10. The fuel nuggets of claim 9 having a moisture content of about 5-7%.

11. The fuel nuggets of claim 9 wherein said amount of urea is a coating of aqueous urea solution.

12. The fuel nugget of claim 11 wherein said solution contains from about 30-60% by weight of urea.

13. The method of claim 1 wherein said nuggets have a diameter between about 0.25-0.50 inch.

14. A fuel nugget prepared according to the method of claim 1.

15. A method of making clean, dust free, dry, urea treated fuel nuggets for burning in automated furnaces and woodburning stoves adapted to burn pelletized fuels, which treated nuggets have a heat content of at least 8400 BTU/lb. and emit lower amounts of formaldehyde than untreated nuggets, and which nuggets are made from particleboard material which contains urea-formaldehyde resin, said method comprising the steps of:
- breaking said particleboard into smaller irregular-shape pieces;
- shaping said smaller irregular-shaped pieces into generally spherical pieces;
- sorting said spherical pieces to obtain nuggets having a diameter between about 0.25-0.50 inch;
- treating said nuggets with an aqueous urea solution to reduce formaldehyde emission, wherein said treated nuggets comprise from about 1-14 10% by weight of said solution; and
- drying said treated nuggets at a temperature of from about 212°—350° F. for a time effective to reduce the moisture content of said treated nuggets to about 5-7% by weight.

16. A fuel nugget prepared according to the method of claim 15.

17. The fuel nugget of claim 11 comprising from about 1-10% by weight of said solution.

18. The fuel nugget of claim 11 comprising about 1% by weight of said solution.

19. The fuel nugget of claim 9 having a diameter of from about 0.25-0.50 inch.

20. The fuel nugget of claim 9 having a heat content of from about 8400-9000 BTU/lb.

21. Clean, dust free, dry, urea treated fuel nuggets for use in automated furnaces and woodburning stoves adapted to burn pelletized fuels, which treated nuggets have a heat content of at least 9400 BTU/lb. and emit lower amounts of formaldehyde than untreated nuggets, comprising:
- spherical wood particles having a diameter of from about 0.25-0.50 inch, said wood particles further comprising urea-formaldehyde resin; and
- from about 1-10% by weight of a coating of an aqueous urea solution to reduce the emission of formaldehyde, said solution containing from about 30-60% by weight of urea;

wherein said fuel nuggets have a moisture content of about 5-7% and a heat content of from about 8400-9000 BTU/lb.

* * * * *